(12) United States Patent
Droz et al.

(10) Patent No.: US 11,921,206 B2
(45) Date of Patent: *Mar. 5, 2024

(54) LIMITATION OF NOISE ON LIGHT DETECTORS USING AN APERTURE

(71) Applicant: Waymo LLC, Mountain View, CA (US)

(72) Inventors: Pierre-Yves Droz, Los Altos, CA (US); Blaise Gassend, East Palo Alto, CA (US); Caner Onal, Palo Alto, CA (US); David Hutchison, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,463

(22) Filed: Nov. 21, 2022

(65) Prior Publication Data

US 2023/0103572 A1    Apr. 6, 2023

Related U.S. Application Data

(63) Continuation of application No. 16/671,399, filed on Nov. 1, 2019, now Pat. No. 11,536,834, which is a
(Continued)

(51) Int. Cl.
*G01S 7/481*    (2006.01)
*G01J 1/04*    (2006.01)
(Continued)

(52) U.S. Cl.
CPC .............. *G01S 17/08* (2013.01); *G01J 1/0411* (2013.01); *G01J 1/0414* (2013.01);
(Continued)

(58) Field of Classification Search
CPC ........ G01S 17/08; G01S 7/481; G01S 7/4816; G01S 7/4863; G01S 7/4868; G01S 17/10;
(Continued)

(56) References Cited

U.S. PATENT DOCUMENTS 2,949,808 A    8/1960  Thurow
4,350,886 A    9/1982  Pommerrenig
(Continued)

FOREIGN PATENT DOCUMENTS

CN    102540651 A    7/2012
CN    103365123 A    10/2013
(Continued)

OTHER PUBLICATIONS

International Search Report and Written Opinion from International Application No. PCT/US2017/055148, dated Jan. 11, 2018.
(Continued)

*Primary Examiner* — Daniel L Murphy
(74) *Attorney, Agent, or Firm* — McDonnell Boehnen Hulbert & Berghoff LLP

(57) ABSTRACT

The present disclosure relates to limitation of noise on light detectors using an aperture. One example embodiment includes a system. The system includes a lens disposed relative to a scene and configured to focus light from the scene onto a focal plane. The system also includes an aperture defined within an opaque material disposed at the focal plane of the lens. The aperture has a cross-sectional area. In addition, the system includes an array of light detectors disposed on a side of the focal plane opposite the lens and configured to intercept and detect diverging light focused by the lens and transmitted through the aperture. A cross-sectional area of the array of light detectors that intercepts the diverging light is greater than the cross-sectional area of the aperture.

20 Claims, 10 Drawing Sheets

Related U.S. Application Data continuation of application No. 15/292,251, filed on Oct. 13, 2016, now Pat. No. 10,502,830.

(51) Int. Cl.

| | |
|---|---|
| *G01J 1/42* | (2006.01) |
| *G01J 1/44* | (2006.01) |
| *G01J 3/02* | (2006.01) |
| *G01S 7/486* | (2020.01) |
| *G01S 7/4863* | (2020.01) |
| *G01S 17/08* | (2006.01) |
| *G01S 17/10* | (2020.01) |
| *G01S 17/42* | (2006.01) |

(52) U.S. Cl.
CPC .......... *G01J 1/0422* (2013.01); *G01J 1/0437* (2013.01); *G01J 1/0448* (2013.01); *G01J 1/0474* (2013.01); *G01J 1/0488* (2013.01); *G01J 1/4228* (2013.01); *G01J 1/44* (2013.01); *G01J 3/0208* (2013.01); *G01J 3/0229* (2013.01); *G01S 7/481* (2013.01); *G01S 7/4816* (2013.01); *G01S 7/4863* (2013.01); *G01S 7/4868* (2013.01); *G01S 17/10* (2013.01); *G01S 17/42* (2013.01); *G01J 2001/442* (2013.01); *G01J 2001/4466* (2013.01)

(58) Field of Classification Search
CPC ....... G01S 17/42; G01J 1/0411; G01J 1/0414; G01J 1/0422; G01J 1/0437; G01J 1/0448; G01J 1/0474; G01J 1/0488; G01J 1/4228; G01J 1/44; G01J 3/0208; G01J 3/0229; G01J 2001/442; G01J 2001/446
USPC ...................................................... 356/4.01
See application file for complete search history.

(56) References Cited

U.S. PATENT DOCUMENTS

| | | | |
|---|---|---|---|
| 5,159,412 A | 10/1992 | Willenborg et al. | |
| 5,214,492 A | 5/1993 | LoBianco et al. | |
| 5,678,089 A | 10/1997 | Bacs, Jr. et al. | |
| 6,031,661 A | 2/2000 | Tanaami | |
| 6,215,587 B1 | 4/2001 | Alfano et al. | |
| 6,542,831 B1 | 4/2003 | Moosmuller et al. | |
| 6,603,534 B2 | 8/2003 | Seifert | |
| 6,987,560 B2 | 1/2006 | Morgan et al. | |
| 7,301,608 B1 | 11/2007 | Mendenhall et al. | |
| 7,440,084 B2 | 10/2008 | Kane | |
| 7,583,364 B1 | 9/2009 | Mayor et al. | |
| 8,836,922 B1 | 9/2014 | Pennecot et al. | |
| 8,864,824 B2 | 10/2014 | Silvestrini et al. | |
| 10,012,532 B2 | 7/2018 | Send et al. | |
| 10,502,830 B2 * | 12/2019 | Droz ................... | G01J 3/0208 |
| 11,536,834 B2 | 12/2022 | Droz et al. | |
| 2001/0055482 A1 | 12/2001 | Braun et al. | |
| 2002/0175294 A1 | 11/2002 | Lee et al. | |
| 2004/0016732 A1 | 1/2004 | Liu et al. | |
| 2004/0178329 A1 | 9/2004 | Kare et al. | |
| 2005/0179888 A1 | 8/2005 | Kallio | |
| 2006/0163455 A1 | 7/2006 | Lewin | |
| 2008/0304012 A1 | 12/2008 | Kwon et al. | |
| 2009/0009747 A1 | 1/2009 | Wolf | |
| 2009/0147239 A1 | 6/2009 | Zhu et al. | |
| 2010/0128353 A1 | 5/2010 | Nagata et al. | |
| 2010/0165322 A1 | 7/2010 | Kane et al. | |
| 2011/0051121 A1 | 3/2011 | Degnan, III et al. | |
| 2013/0023039 A1 | 1/2013 | Zaccarin et al. | |
| 2013/0300838 A1 | 11/2013 | Borowski | |
| 2014/0049783 A1 | 2/2014 | Royo Royo et al. | |
| 2014/0146303 A1 | 5/2014 | Mitchell et al. | |
| 2014/0175294 A1 | 6/2014 | Frach | |
| 2014/0354983 A1 | 12/2014 | Kolchin et al. | |
| 2015/0059026 A1 | 2/2015 | Hermans et al. | |
| 2015/0204978 A1 | 7/2015 | Hammes et al. | |
| 2015/0293018 A1 | 10/2015 | Stork et al. | |
| 2016/0042522 A1 | 2/2016 | Wajs et al. | |
| 2016/0054219 A1 | 2/2016 | Blaha et al. | |
| 2016/0142657 A1 | 5/2016 | Caulfield | |
| 2016/0223671 A1 | 8/2016 | Thayer et al. | |
| 2017/0153319 A1 | 6/2017 | Villeneuve et al. | |
| 2018/0164414 A1 | 6/2018 | Gnecchi et al. | |
| 2018/0231642 A1 | 8/2018 | Lee et al. | |
| 2018/0238999 A1 | 8/2018 | Koyama | |

FOREIGN PATENT DOCUMENTS

| | | |
|---|---|---|
| CN | 105921186 A | 9/2016 |
| CN | 107924817 A | 4/2018 |
| DE | 202014100836 U1 | 5/2015 |
| EP | 2469295 A1 | 6/2012 |
| EP | 2910969 A1 | 8/2015 |
| JP | H05-134040 A | 5/1993 |
| JP | H05-232212 A | 9/1993 |
| JP | H10-206740 A | 8/1998 |
| JP | 11097655 A | 4/1999 |
| JP | 2000-121724 A | 4/2000 |
| JP | 2001-045520 A | 2/2001 |
| JP | 2002071567 A | 3/2002 |
| JP | 2003-057343 A | 2/2003 |
| JP | 2007-121083 A | 5/2007 |
| JP | 2009-103626 A | 5/2009 |
| JP | 2012-202776 A | 10/2012 |
| JP | 2013-113669 A | 6/2013 |
| JP | 2015-161683 A | 9/2015 |
| KR | 101376227 B1 | 3/2014 |
| WO | 2014/144157 A1 | 9/2014 |

OTHER PUBLICATIONS

U.S. Appl. No. 15/383,310—Non Final Office Action dated Mar. 8, 2019.
International Search Report related to Application No. PCT/EP2017/082561 dated Mar. 8, 2018.
WIPO English translation of DE 202014100836, Sick AG, translated May 6, 2019, German publication dated 2014 (Year: 2019).
"Development of Automotive LIDAR"; Cristiano Niclass, et al.; Electronics and Communications in Japan, vol. 98, No. 5, 2015 (Apr. 8, 2015).

* cited by examiner

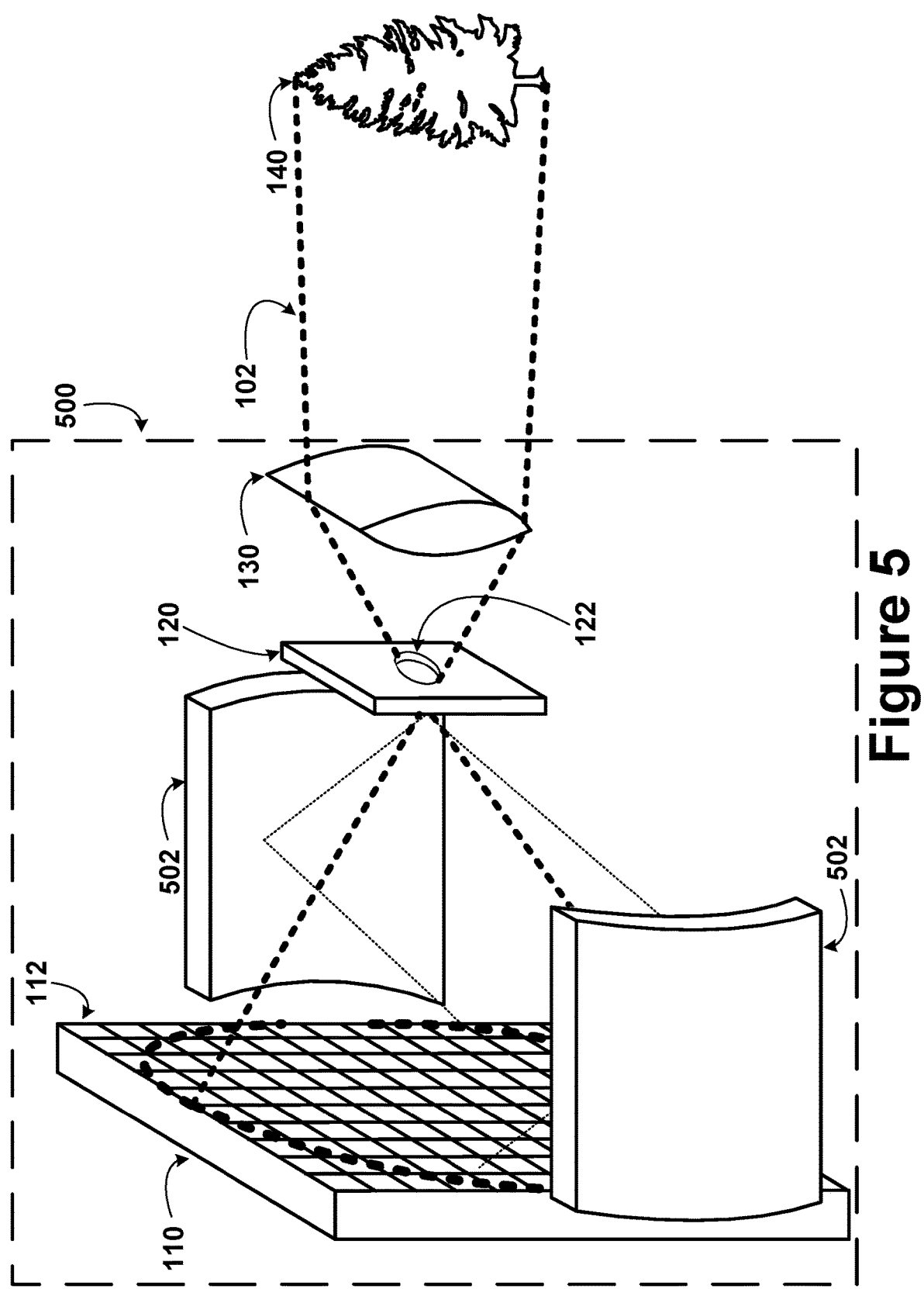

LIMITATION OF NOISE ON LIGHT DETECTORS USING AN APERTURE

CROSS-REFERENCE TO RELATED APPLICATIONS

This application is a continuation of U.S. patent application Ser. No. 16/671,399, filed Nov. 1, 2019, which is a continuation of U.S. patent application Ser. No. 15/292,251, filed Oct. 13, 2016. The foregoing applications are incorporated herein by reference.

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, corresponding to an intensity of the light). Many types of such devices are fabricated out of semiconducting materials, such as silicon. In order to detect light over a substantial geometric area, multiple light detectors can be arranged into arrays connected in parallel. These arrays are sometimes referred to as silicon photomultipliers (SiPMs) or multi-pixel photon counters (MPPCs).

Some of the above arrangements are sensitive to relatively low intensities of light, thereby enhancing their detection qualities. However, this can lead to the above arrangements also being disproportionately susceptible to adverse background effects (e.g., extraneous light from outside sources could affect a measurement by the light detectors). As such, a method or device for reducing the background effects affecting the light detection could increase the accuracy of measurements made by such light detectors.

SUMMARY

The specification and drawings disclose embodiments that relate to a limitation of noise on light detectors using an aperture.

An example light detection system may include a lens, an aperture, and an array of light detectors. The aperture may be placed at the focal plane of the lens, and the lens may focus light scattered by an object within a scene. The aperture may limit the amount of light transmitted to the array of light detectors by limiting the amount of light transmitted at the focal plane of the lens. By limiting the amount of light transmitted through the aperture, the aperture may reduce the background light transmitted to the array. After passing through the aperture, the light may diverge as the light approaches the array. The light may then be intercepted and detected by a portion of the light detectors within the array. By allowing the light to diverge after passing through the aperture, the detection area of the array is increased when compared to the same cross-section of the light at the focal plane (i.e., the cross-section of the detection area of the array is larger than the cross-section of the aperture). Thus, more light detectors can be spread across the detection area, thereby increasing the dynamic range, sensitivity, or imaging resolution of the array of light detectors.

In a first aspect, the disclosure describes a system. The system includes a lens disposed relative to a scene and configured to focus light from the scene onto a focal plane. The system also includes an aperture defined within an opaque material disposed at the focal plane of the lens. The aperture has a cross-sectional area. The system further includes an array of light detectors disposed on a side of the focal plane opposite the lens and configured to intercept and detect diverging light focused by the lens and transmitted through the aperture. A cross-sectional area of the array of light detectors that intercepts the diverging light is greater than the cross-sectional area of the aperture.

In a second aspect, the disclosure describes a method. The method includes focusing, by a lens disposed relative to a scene, light from the scene onto a focal plane. The method also includes transmitting, through an aperture defined within an opaque material disposed at the focal plane of the lens, the light from the scene. The aperture has a cross-sectional area. The method further includes diverging, by the light from the scene transmitted through the aperture. In addition, the method includes intercepting, by an array of light detectors disposed on a side of the focal plane opposite the lens, the diverged light from the scene. A cross-sectional area of the array of light detectors that intercept the diverged light from the scene is greater than the cross-sectional area of the aperture. The method additionally includes detecting, by the array of light detectors, the intercepted light.

In a third aspect, the disclosure describes a light detection and ranging (LIDAR) device. The LIDAR device includes a LIDAR transmitter configured to illuminate a scene with light. The LIDAR device also includes a LIDAR receiver configured to receive light scattered by one or more objects within the scene to map the scene. The LIDAR receiver includes a lens configured to focus the light scattered by the one or more objects within the scene onto a focal plane. The LIDAR receiver also includes an aperture defined within an opaque material disposed at the focal plane. The aperture has a cross-sectional area. The LIDAR receiver further includes an array of light detectors disposed on a side of the focal plane opposite the lens and configured to intercept and detect diverging light focused by the lens and transmitted through the aperture. A cross-sectional area of the array of light detectors that intercepts the diverging light is greater than the cross-sectional area of the aperture.

In an additional aspect, the disclosure describes a system. The system includes a means for focusing light from a scene onto a focal plane. The means for focusing is disposed relative to the scene. The system also includes a means for transmitting, through an aperture defined within an opaque material disposed at the focal plane of the lens, the light from the scene. The aperture has a cross-sectional area. The system further includes a means for diverging the light from the scene transmitted through the aperture. In addition, the system includes a means for intercepting the diverged light from the scene. The means for intercepting is disposed on a side of the focal plane opposite the means for focusing. A cross-sectional area of the means for intercepting that intercept the diverged light from the scene is greater than the cross-sectional area of the aperture. The system additionally includes a means for detecting the intercepted light.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is an illustration of a noise limiting system that includes an aperture, according to example embodiments.

DETAILED DESCRIPTION

Figure 1A:
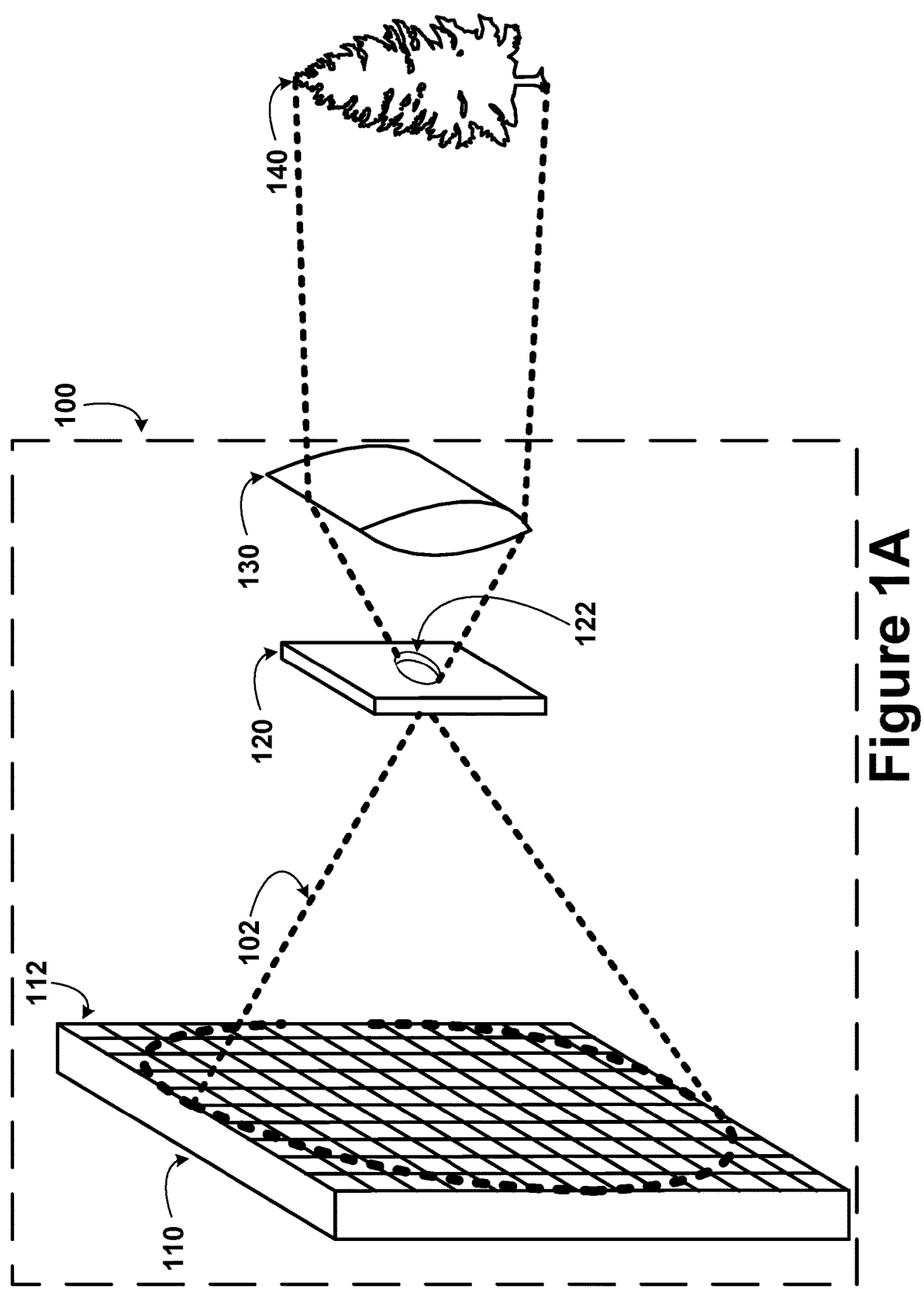
FIG. 1A is an illustration of a noise limiting system that includes an aperture, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments may relate to devices, systems, and methods for reducing background light imparted onto an array of light detectors. The light detectors in the array may be sensing light from a scene (e.g., the light detectors may be a sensing component of a LIDAR system).

One example system can include a lens. The lens may be used to focus light from a scene onto a focal plane. However, the lens may also focus background light not intended to be observed onto the focal plane (e.g., sunlight within the scene). In order to selectively filter the light (i.e., separate background light from light corresponding to information within the scene), an opaque material (e.g., selectively etched metal or a glass substrate with a mask placed over it) may be placed at the focal plane of the lens. The opaque material could be a slab, a sheet, or various other shapes in a variety of embodiments. Within the opaque material, an aperture may be defined. The aperture may select a region of, or the entirety of, the light of the scene focused by the lens onto the focal plane.

On a backside of the opaque material (i.e., a side of the opaque material opposite the lens), the light selected by the aperture may diverge from the aperture. In the direction of divergence of the light, the system may include an array of light detectors (e.g., SPADs) disposed some distance from the aperture. This array of light detectors may detect the diverging light (e.g., an intensity of the diverging light). Because the light is diverging, the number of light detectors able to fit into a detection area can be larger than could fit in a detection area corresponding to the same cone of light at the focal plane of the lens. This is due to the fact that the detection area would be more tightly focused, and thus smaller, at the focal plane of the lens than at a distance displaced from the aperture. As an example, an aperture having a cross-sectional area of 200 μm by 200 μm may occupy an equivalent area to hundreds of SPADs (e.g., each SPAD having a cross-sectional area between 200 μm$^2$ and 600 μm$^2$). By comparison, if the light diverges away from the aperture to a distance corresponding to a circular cross-sectional area having a diameter of 1.33 mm, the detection area, at that plane, may occupy an equivalent area to thousands or tens of thousands of SPADs.

Further, the distance by which the light detector array is displaced from the aperture (i.e., the distance the light detector array is displaced from the focal plane of the lens) can vary in various embodiments. The number of light detectors positioned to detect the light diverging from the aperture may be increased by increasing the distance between the light detector array and the aperture. For example, for scenes that have an increased amount of background light, the light detector array could be displaced an increased distance from the aperture.

Additionally, in some embodiments, the aperture may be adjustable. For example, the cross-sectional area of the aperture could be varied. In some embodiments, the cross-sectional area may be defined by an iris that can open or close to increase or decrease the opening within the opaque material that defines the aperture. Alternatively, the aperture may be a slit within the opaque material that is partially covered by a retractable shade. The retractable shade could be retracted or extended to alter the amount of light transmitted through the aperture, and thus, change the effective cross-sectional area of the aperture. Even further, the opaque material may have multiple apertures defined therein. The multiple apertures may have different shapes and/or sizes. Further, the system could include one or more mirrors (e.g., microelectromechanical systems, MEMS, mirrors) that reflect light from the lens toward the opaque material. The one or more mirrors could change angle with respect to the lens or could change orientation such that a different one of the mirrors was in the path of the light focused by the lens. This could allow a different one of the apertures defined within the opaque material to be selected, thereby changing the effective aperture area.

II. Example Systems

FIG. 1A is an illustration of a noise limiting system 100 that includes an aperture, according to example embodiments. The system 100 may include an array 110 of light detectors 112, an aperture 122 defined within an opaque material 120, and a lens 130. The system 100 may measure light 102 scattered by an object 140 within a scene. The light 102 may also come, at least partially, from background sources. The noise limiting system 100 may be a part of a LIDAR device (e.g., a LIDAR receiver), in various embodiments. For example, the LIDAR device may be used for navigation of an autonomous vehicle. Further, in some embodiments, the noise limiting system 100, or portions thereof, may be contained within an area that is unexposed to exterior light other than at the lens 130 or aperture 122. This may prevent ambient light from triggering the light detectors 112 and adversely affecting any measurements.

The array 110 is an arrangement of the light detectors 112. In various embodiments, the array 110 may have different shapes. As illustrated in FIG. 1A, the array 110 may have a rectangular or a square shape. In alternate embodiments, the array 110 may be circular. The size of the array 110 may correspond to a cross-sectional area of the light 110 diverging from the aperture 122, based on the distance the array 110 is positioned from the aperture 122. In some embodiments, the array 110 may be movable. The array 110 may be moveable closer to, or further from, the aperture 122. For example, the array may be on an electrical stage capable of translating in one, two, or three dimensions.

Further, the array 110 may have one or more outputs to a computing device. The computing device (e.g., a microprocessor) may receive electrical signals from the array 110 which indicate an intensity of the light 102 incident on the light detectors 112. The computing device may use the electrical signals to determine information about the object 140 (e.g., distance of the object 140 from the aperture 122). In embodiments where there is a single connection between the array 110 and the computing device, the light detectors 112 within the array 110 may be interconnected with one another in parallel. As such, the array 110 may be an SiPM or an MPPC, depending on the particular arrangement and type of the light detectors 112 within the array 110.

The light detectors 112 may be one of a variety of types. For example, the light detectors 112 may be SPADs. SPADs may make use of avalanche breakdown within a reverse biased p-n junction (i.e., diode) to increase output current for a given incident illumination on the photodetector. Further, SPADs may be able to generate multiple electron-hole pairs for a single incident photon. In alternate embodiments, the light detectors 112 may be APDs. Both APDs and SPADs may be biased above the avalanche breakdown voltage. Such a biasing condition may create a positive feedback loop having a loop gain that is greater than one. Thus, APDs and SPADs biased above the threshold avalanche breakdown voltage may be single photon sensitive. In still other embodiments, the light detectors 112 may be photoresistors, charge-coupled devices (CCDs), or photovoltaic cells.

In various embodiments, the array 110 may include more than one type of light detector across the array. For example, if multiple wavelengths are being detected by the array 110, the array 110 may comprise some SPADs that are sensitive to one range of wavelengths and some SPADs that are sensitive to a different range of wavelengths. In some embodiments, the light detectors 110 may be sensitive to wavelengths between 400 nm and 1.6 µm (visible and infrared wavelengths). Further the light detectors 110 may have various sizes and shapes within a given embodiment or across various embodiments. In example embodiments, the light detectors 112 may be SPADs that have package sizes that are 1%, 0.1%, or 0.01% of the area of the array 110.

The opaque material 120 may block the light 102 from the scene (e.g., background light) that is focused by the lens 130 from being transmitted to the array 110. As such, the opaque material 120 may be configured to block certain background light that could adversely affect the accuracy of a measurement performed by the array 110 of light detectors 112. The opaque material 120, and therefore the aperture 122, may be positioned at or near a focal plane of the lens 130. The opaque material 120 may block transmission by absorbing the light 102. Additionally or alternatively, the opaque material 120 may block transmission by reflecting the light 102. In some embodiments, the opaque material 120 may be etched metal. In alternate embodiments, the opaque material 120 may be a polymer substrate, a biaxially-oriented polyethylene terephthalate (BoPET) sheet (also referred to as a Mylar® sheet), or a glass overlaid with an opaque mask. Other opaque materials are also possible in various alternate embodiments.

The aperture 122 provides a port within the opaque material 120 through which the light 102 may be transmitted. The aperture 122 may be defined within the opaque material 120 in a variety of ways. For example, if the opaque material 120 is a metal, the metal may be etched to define the aperture 122. Alternatively, if the opaque material 120 is a glass substrate overlaid with a mask, the mask may include an aperture 122 defined using photolithography. In various embodiments, the aperture 122 may be partially or wholly transparent. For example, if the opaque material 120 is a glass substrate overlaid with a mask, the aperture 122 may be defined by the portion of the glass substrate not covered by the mask, meaning the aperture 122 is not completely hollow, but rather is made of glass. Therefore, the aperture 122 may be nearly, but not entirely, transparent to the wavelengths of the light 102 scattered by the object 140 (because most glasses are not 100% transparent).

The aperture 122 (in conjunction with the opaque material 120) may perform to spatially filter the light 102 from the scene at the focal plane. For example, the light 102 may be focused onto the focal plane at a surface of the opaque material 120, and the aperture 122 may allow only a portion of the focused light to be transmitted to the array 110. As such the aperture 122 may behave as an optical pinhole. In example embodiments, the aperture may have a cross-sectional area of between 0.02 mm$^2$ and 0.06 mm$^2$ (e.g., 0.04 mm$^2$).

Although the term "aperture" as used above with respect to the aperture 122 describes a recess or hole in an opaque material through which light may be transmitted, it is understood that the term "aperture" may include a broad array of optical features. For example, as used throughout the description and claims, the term "aperture" may additionally encompass transparent or translucent structures defined within an opaque material through which light can be partially transmitted. Further, the term "aperture" may describe a structure that otherwise selectively limits the passage of light (e.g., through reflection or refraction), such as a mirror surrounded by an opaque material. In one example embodiment, mirrored arrays surrounded by an opaque material may be arranged to reflect light in a certain direction, thereby defining a reflective portion. This reflective portion may be referred to as an "aperture".

The lens 130 may focus the light 102 from the scene onto the focal plane (e.g., where the aperture 122 is positioned). In this way, the light intensity collected from the scene, at the lens 130, may be maintained while reducing the cross-sectional area over which the light 102 is being projected (i.e., increasing the spatial power density of the light 102). As such, the lens 130 may be a converging lens. As illustrated in FIG. 1A, the lens 130 may be a biconvex lens. For example, the lens may be a spherical lens. In alternate embodiments, the lens may be a consecutive set of lens positioned one after another (e.g., a biconvex lens that focuses light in a first direction and an additional biconvex lens that focuses light in a second plane that is orthogonal to the first direction). Other types of lenses are also possible. In addition, there may be other free space optics (e.g., mirrors) positioned near the lens 130 to aid in focusing the light 102 incident on the lens 130 onto the opaque material 120.

The object 140 may be any object positioned within a scene surrounding the noise limiting system 100. If the noise limiting system 100 is a component of a receiver of a LIDAR system, the object 140 may be illuminated by a transmitter of the same LIDAR system using the light 102. In example embodiments where the LIDAR system is used for navigation on an autonomous vehicle, the object 140 may be pedestrians, other vehicles, obstacles (e.g., trees), or road signs.

The light 102, as described above, may be produced by a transmitter within a LIDAR device. As illustrated, the light 102 may be scattered by the object 140, focused by the lens 130, transmitted through the aperture 122 in the opaque material 120, and measured by the array 110 of light detectors 112. This sequence may occur (e.g., within a LIDAR device) to determine something about the object 140. In some embodiments, the light measured by the array may instead be light that scattered from multiple objects or from no objects (e.g., light transmitted by a transmitter of a LIDAR device is not reflected back toward the LIDAR device, so the lens only focuses ambient light, such as sunlight).

In addition, the wavelength of the light 102 used to analyze the object 140 may be tailored based on the types of objects expected to be within a scene and their expected distance from the lens 130. For example, if the objects expected to be within the scene absorb all incoming light of 500 nm wavelength, a wavelength other than 500 nm may be selected to illuminate the object 140 and to be analyzed by the noise limiting system 100. The wavelength of the light 102 (e.g., if transmitted by a transmitter of a LIDAR device) may correspond to a source that generates the light 102. For example, if the light is generated by a diode laser, the light 102 may be of a wavelength range centered on 900 nm. A multitude of different sources may be capable of generating the light 102 (e.g., an optical fiber amplifier, various types of lasers, a broadband source with a filter, etc.).

Figure 1B:
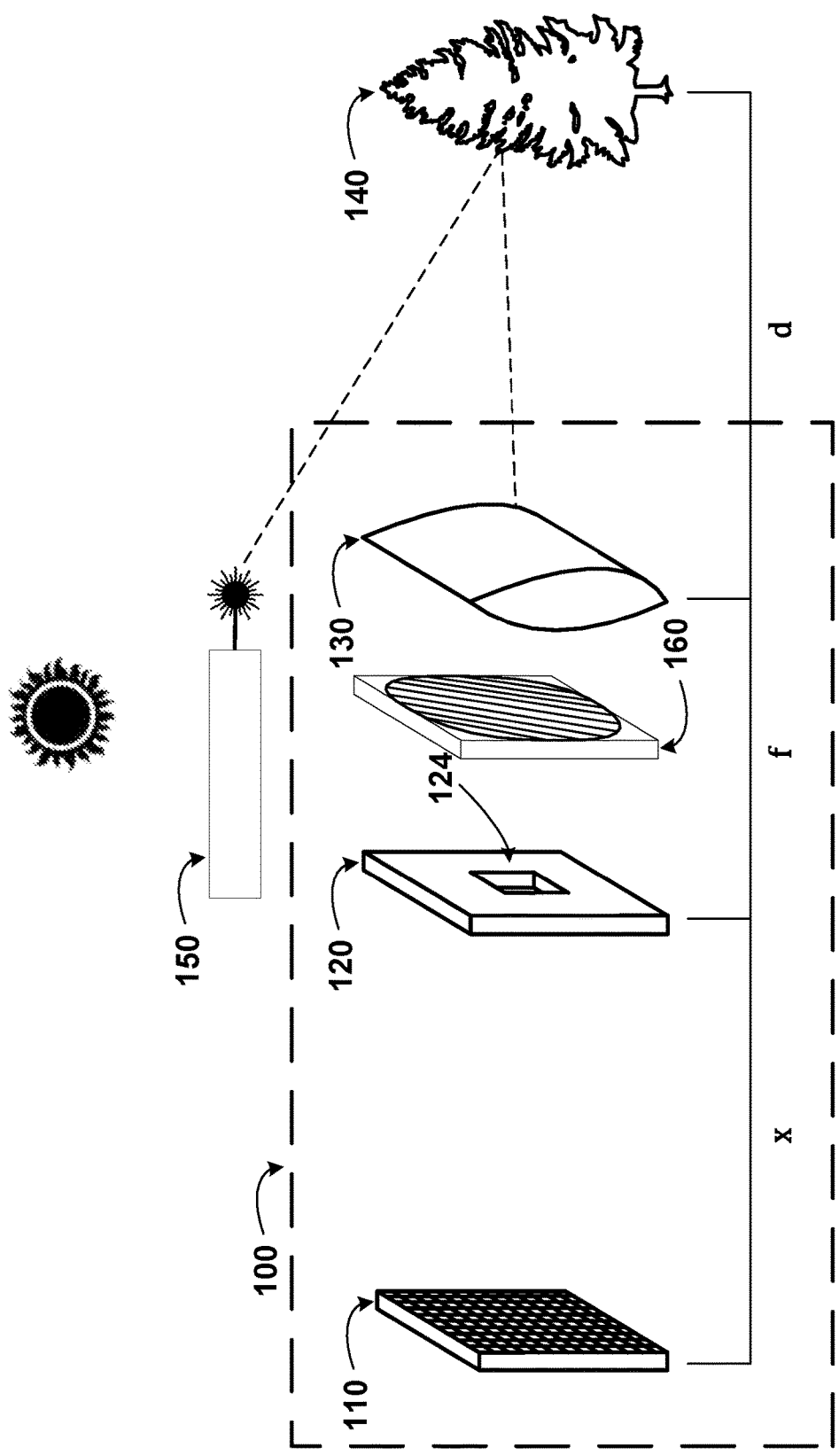
FIG. 1B is an illustration of a noise limiting system that includes an aperture, according to example embodiments.

FIG. 1B is an illustration of the noise limiting system 100 illustrated in FIG. 1A. As indicated, the distance between the object 140 and the lens 130 is 'd', the distance between the lens 130 and the opaque material 120 (with a rectangular aperture 126 defined therein, as opposed to the round aperture 122 illustrated in FIG. 1A) is 'f', and the distance between the opaque material 120 and the array 110 is 'x'. In the embodiment illustrated, the opaque material 120 and aperture 126 may be positioned at the focal plane of the lens (i.e., 'f' may be equivalent to the focal length of the lens). Further, there may be a filter 160 placed between the lens 130 and the opaque material 120. Also located at a distance 'd' from the object 140 is an emitter 150 (e.g., a laser with a LIDAR transmitter) that emits a signal to be measured by the array 110.

The following is a mathematical illustration comparing the amount of background light that is detected by the array 110 to the amount of signal light that is detected by the array 110. For the sake of illustration, it is assumed that the object 140 is fully illuminated by sunlight at normal incidence, where the sunlight represents a background light source. Further, it is assumed that all the light that illuminates the object 140 is scattered according to Lambert's cosine law. In addition, it is assumed that all of the light (both background and signal) that reaches the plane of the array 110 is fully detected by the array 110.

The power of the signal, emitted by the emitter 150, that reaches the aperture 124, and thus the array 110, can be calculated using the following:

$$P_{signal} = P_{tx} \times \Gamma \times \frac{A_{lens}}{\pi d^2}$$

where $P_{signal}$ represents the radiant flux (e.g., in W) of the optical signal emitted by the emitter 150 that reaches the array 110, $P_{tx}$ represents the power (e.g., in W) transmitted by the emitter 150, $\Gamma$ represents the reflectivity of the object 140 (e.g., taking into account Lambert's Cosine Law), and $A_{lens}$ represents the cross-sectional area of the lens 130.

In addition, the background light that reaches the lens 130 can be calculated as follows:

$$\overline{P}_{background} = \frac{\overline{P}_{sun} \times T_{filter}}{\pi}$$

where $\overline{P}_{background}$ represents the radiance $$\left(e.g., \text{in } \frac{w}{m^2 \cdot sr}\right)$$

of the background signal caused by sunlight scattering off the object 140 arriving on the lens 130 that is within a wavelength band that will be selectively passed by the filter 160, $\overline{P}_{sun}$ represents the irradiance $$\left(e.g., \text{in } \frac{w}{m^2}\right)$$

density due to the sun (i.e., the background source), and $T_{filter}$ represents the transmission coefficient of the filter 160 (e.g., a bandpass optical filter). The factor of $$\frac{1}{\pi}$$

comes in due to the assumption of Lambertian scattering off of the object 140 from normal incidence.

The aperture 124 reduces the amount of background light permitted to be transmitted to the array 110. To calculate the power of the background light that reaches the array 110, after being transmitted through the aperture 124, the area of the aperture 124 is taken into account. The cross-sectional area of the aperture can be calculated using the following:

$$A_{aperture} = w \times h$$

where $A_{aperture}$ represents the surface area of the aperture 126 relative to the object 140, and w and h represent the width and height of the aperture 124, respectively. In addition, if the lens 130 is a circular lens, the cross-sectional area of the lens is:

$$A_{lens} = \pi \left(\frac{d_{lens}}{2}\right)^2$$

where $d_{lens}$ represents the diameter of the lens.

To calculate the background power transmitted to the array 110 through the aperture 124, the following can be used:

$$P_{background} = \overline{P}_{background} \times \frac{A_{aperture}}{f^2} \times A_{lens}$$

where $P_{background}$ represents background power incident on the array 110, and $$\frac{A_{aperture}}{f^2}$$

represents the acceptance solid angle in steradians. The above formula shows that $P_{background}$ is the amount of radiance in the background signal after being reduced by the lens 130 and then the aperture 124.

Substituting the above determined values in for $\overline{P}_{background}$, $A_{aperture}$, and $A_{lens}$ the following can be derived:

$$P_{background} = \left(\frac{\overline{P}_{sun} T_{filter}}{\pi}\right) \times \left(\frac{wh}{f^2}\right) \times \left(\pi \left(\frac{d_{lens}}{2}\right)^2\right) = \overline{P}_{sun} T_{filter} wh \frac{d_{lens}^2}{4f^2}$$

Further, the quantity $$\frac{f}{d_{lens}}$$

may be referred to as the "F number" of the lens 130. Thus, with one more substitution, the following can be deduced for background power:

$$P_{background} = \frac{\overline{P}_{sun} T_{filter} wh}{4F^2}$$

Making similar substitutions, the following can be deduced for signal power transmitted from the emitter 150 that arrives at the array 110:

$$P_{signal} = P_{tx} \times \Gamma \times \frac{\pi \left(\frac{d_{lens}}{2}\right)^2}{\pi d^2} = \frac{P_{tx} \Gamma d_{lens}^2}{4d^2}$$

By comparing $P_{signal}$ with $P_{background}$, a signal to noise ratio (SNR) may be determined. As demonstrated, an inclusion of the aperture 124, particularly for apertures having small w and/or small h, the background power can be significantly reduced with respect to the signal power. Besides reducing aperture area, increasing the transmitted power by the emitter 150, decreasing the transmission coefficient (i.e., reducing an amount of background light that gets transmitted through the filter), and increasing the reflectivity of the object 140 may be ways of increasing the SNR. In the case of a pulsed signal, the shot noise of the background, as opposed to the power of the background, may be primarily relevant when computing the SNR.

As described above, the light transmitted through the aperture 124 may diverge as it approaches the array 110. Due to the divergence, the detection area at the array 110 of light detectors may be larger than the cross-sectional area of the aperture 124 at the focal plane. An increased detection area (e.g., measured in m$^2$) for a given light power (e.g., measured in W) leads to a reduced light intensity (e.g., measured in $$\frac{W}{m^2})$$

incident upon the array 110.

The reduction in light intensity may be particularly beneficial in embodiments where the array 110 includes SPADs or other light detectors having high sensitivities. For example, SPADs derive their sensitivity from a large reverse-bias voltage that produces avalanche breakdown within a semiconductor. This avalanche breakdown can be triggered by the absorption of a single photon. Once a SPAD absorbs a single photon and the avalanche breakdown begins, the SPAD cannot detect additional photons until the SPAD is quenched (e.g., by restoring the reverse-bias voltage). The time until the SPAD is quenched may be referred to as the recovery time. If additional photons are arriving at time intervals approaching the recovery time (e.g., within a factor of ten of the recovery time), the SPAD begins to saturate, and the measurements by the SPAD may no longer directly correlate to the power of the light incident on the SPAD. Thus, by reducing the light power incident on any individual light detector (e.g., SPAD) within the array 110, the light detectors within the array 110 (e.g., SPADs) may remain unsaturated. As such, the light measurements by each individual SPAD may have an increased accuracy.

Figure 2:
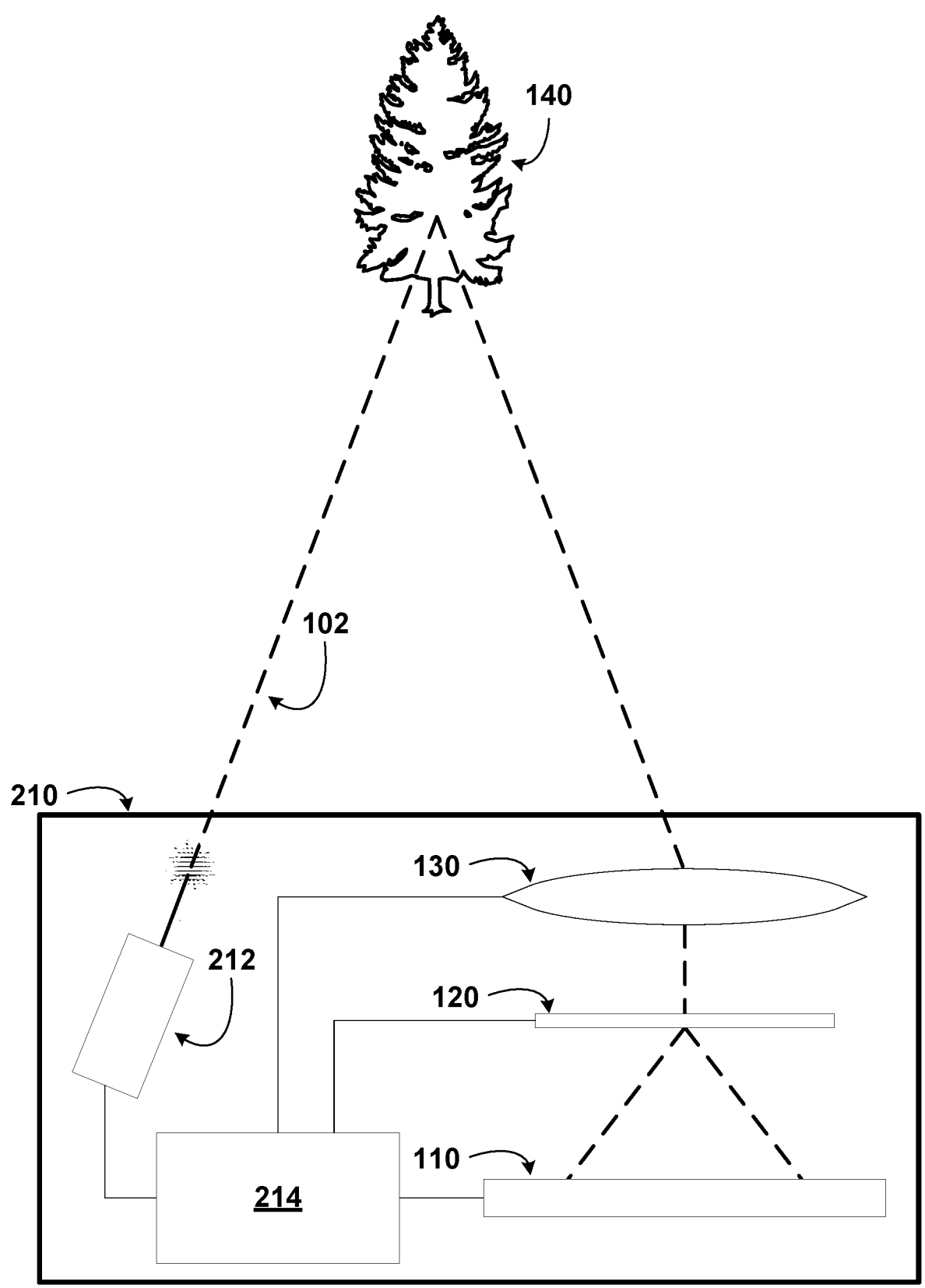
FIG. 2 is an illustration of a noise limiting LIDAR device that includes an aperture, according to example embodiments.

FIG. 2 is an illustration of a noise limiting LIDAR device 210 that includes an aperture, according to example embodiments. The LIDAR device 210 may include a laser emitter 212, a computing device 214, an array 110 of light detectors, an opaque material 120 with the aperture defined therein, and a lens 130. The LIDAR device 210 may use light 102 to map an object 140 within a scene. The LIDAR device 210 may be used within an autonomous vehicle for navigation, in example embodiments.

The laser emitter 212 may emit the light 102 which is scattered by the object 140 in the scene and ultimately measured by the array 110 of light detectors (e.g., the light detectors 102 illustrated in FIG. 1A). In some embodiments, the laser emitter 212 may include an optical fiber amplifier or other amplifying system to increase the power output of the laser emitter 212. Further, the laser emitter 212 may be a pulsed laser (as opposed to a continuous wave, CW, laser), allowing for increased peak power while maintaining an equivalent continuous power output.

The computing device 214 may be configured to control components of the LIDAR device 210 and to analyze signals received from components of the LIDAR device 210 (e.g., the array 110 of light detectors 112). The computing device 214 may include a processor (e.g., a microprocessor of a microcontroller) that executes instructions stored within a memory to perform various actions. The computing device 214 may use timing associated with a signal measured by the array 110 to determine a location (e.g., the distance from the LIDAR device 210) of the object 140. For example, in embodiments where the laser emitter 212 is a pulsed laser, the computing device 214 can monitor timings of the output light pulses and compare those timings with timings of the signal pulses measured by the array 110. This comparison may allow the computing device 214 to compute the distance of the object 140 based on the speed of light and the time of travel of the light pulse. In order to make an accurate comparison between the timing of the output light pulses and the timing of the signal pulses measured by the array 110, the computing device 214 may be configured to account for parallax (e.g., because the laser emitter 212 and the lens 130 are not located at the same location in space).

In some embodiments, the computing device 214 may be configured to modulate the laser emitter 212 of the LIDAR device 210. For example, the computing device 214 may be configured to change the direction of projection of the laser emitter 212 (e.g., if the laser emitter 212 is mounted to or includes a mechanical stage). The computing device 214 may also be configured to modulate the timing, the power, or the wavelength of the light 102 emitted by the laser emitter 212. Such modulations may include the addition or removal of filters from the path of the light 102, in various embodiments.

Additionally, the computing device 214 may be configured to adjust the location of the lens 130, the opaque material 120, and the array 110 relative to one another. For example, the lens 130 may be on a movable stage that is controlled by the computing device 214 to adjust the location of the lens 130, and thus the location of the focal plane of the lens 130. Further, the array 110 may be on a separate stage that allows the array 110 to be moved relative to the opaque material 120 and the aperture 122. The array 110 may be moved by the computing device 214 to alter the detection area on the array 110. As the array 110 is moved farther from the opaque material 120, the cross-sectional detection area on the array 110 may increase because the light 102 diverges as the distance from the aperture 122 is increased. Therefore, the computing device 214 may move the array 110 to alter the number of light detectors 112 illuminated by the diverging light 102.

In some embodiments, the computing device may also be configured to control the aperture. For example, the aperture may, in some embodiments, be selectable from a number of apertures defined within the opaque material. In such embodiments, a MEMS mirror located between the lens and the opaque material may be adjustable by the computing device to determine to which of the multiple apertures the light is directed. In some embodiments, the various apertures may have different shapes and sizes. In still other embodiments, the aperture may be defined by an iris (or other type of diaphragm). The iris may be expanded or contracted by the computing device, for example, to control the size of the aperture.

Figure 3:
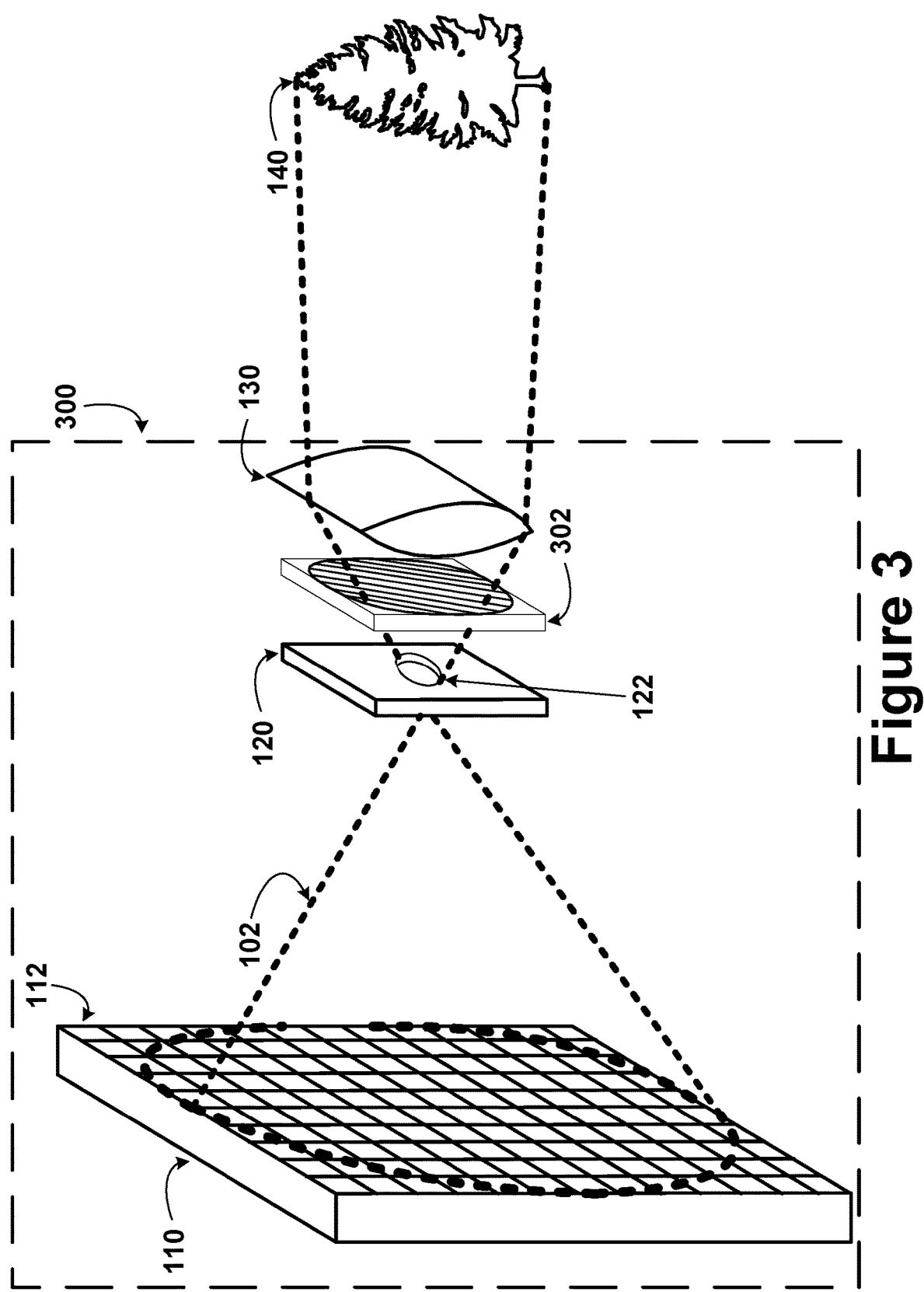
FIG. 3 is an illustration of a noise limiting system that includes an aperture, according to example embodiments.

FIG. 3 is an illustration of a noise limiting system 300 that includes an aperture, according to example embodiments. Similar to the system 100 illustrated in FIG. 1A, the system 300 may include an array 110 of light detectors 112, an aperture 122 defined within an opaque material 120, and a lens 130. In addition, the system 300 may include an optical filter 302. The system 300 may measure light 102 scattered by an object 140 within a scene. The lens 130, the opaque material 120 defined with the aperture 122, and the array 110 of light detectors 112 may behave analogously as described with respect to FIG. 1A.

The optical filter 302 may be configured to divert light of particular wavelengths away from the array 110. For example, if the noise limiting system 300 is a component of a LIDAR device (e.g., a detector of a LIDAR device), the optical filter 302 may divert any light away from the array 110 that is not of the wavelength range emitted by a laser emitter of the LIDAR device. Therefore, the optical filter 302 may, at least partially, prevent ambient light or background light from adversely affecting the measurement by the array 110.

In various embodiments, the optical filter 302 may be located in various positions relative to the array 110. As illustrated in FIG. 3, the optical filter 302 may be located in between the lens 130 and the opaque material 120. The optical filter may alternatively be located between the lens and the object, between the opaque material and the array, or on the array itself (e.g., the array may have a screen covering the surface of the array that includes the optical filter or each of the light detectors may individually be covered by a separate optical filter).

The optical filter 302 may be an absorptive filter. Additionally or alternatively, the optical filter 302 may be a reflective filter. The optical filter 302 may selectively transmit wavelengths within a defined wavelength range (i.e., act as a bandpass optical filter, such as a monochromatic optical filter), wavelengths outside a defined wavelength range (i.e., act as a band-rejection optical filter), wavelengths below a defined threshold (i.e., act as a lowpass optical filter), or wavelengths above a defined threshold (i.e., a highpass optical filter). Further, in some embodiments, multiple optical filters may be cascaded to achieve optimized filtering characteristics (e.g., a lowpass filter cascaded with a highpass filter to achieve a bandpass filter characteristic). The optical filter 302 may be a dichroic filter or cascaded dichroic filters, in some embodiments. In alternate embodiments, the optical filter 302 may be a diffractive filter. A diffractive filter may split the optical path of background light and signal light. This may allow separate background tracking, in some embodiments.

Further, the optical filter 302 may selectively transmit based on qualities of light other than wavelength. For example, the optical filter 302 may selectively transmit light based on polarization (e.g., horizontally polarized or vertically polarized). Alternate types of optical filters are also possible.

Figure 4:
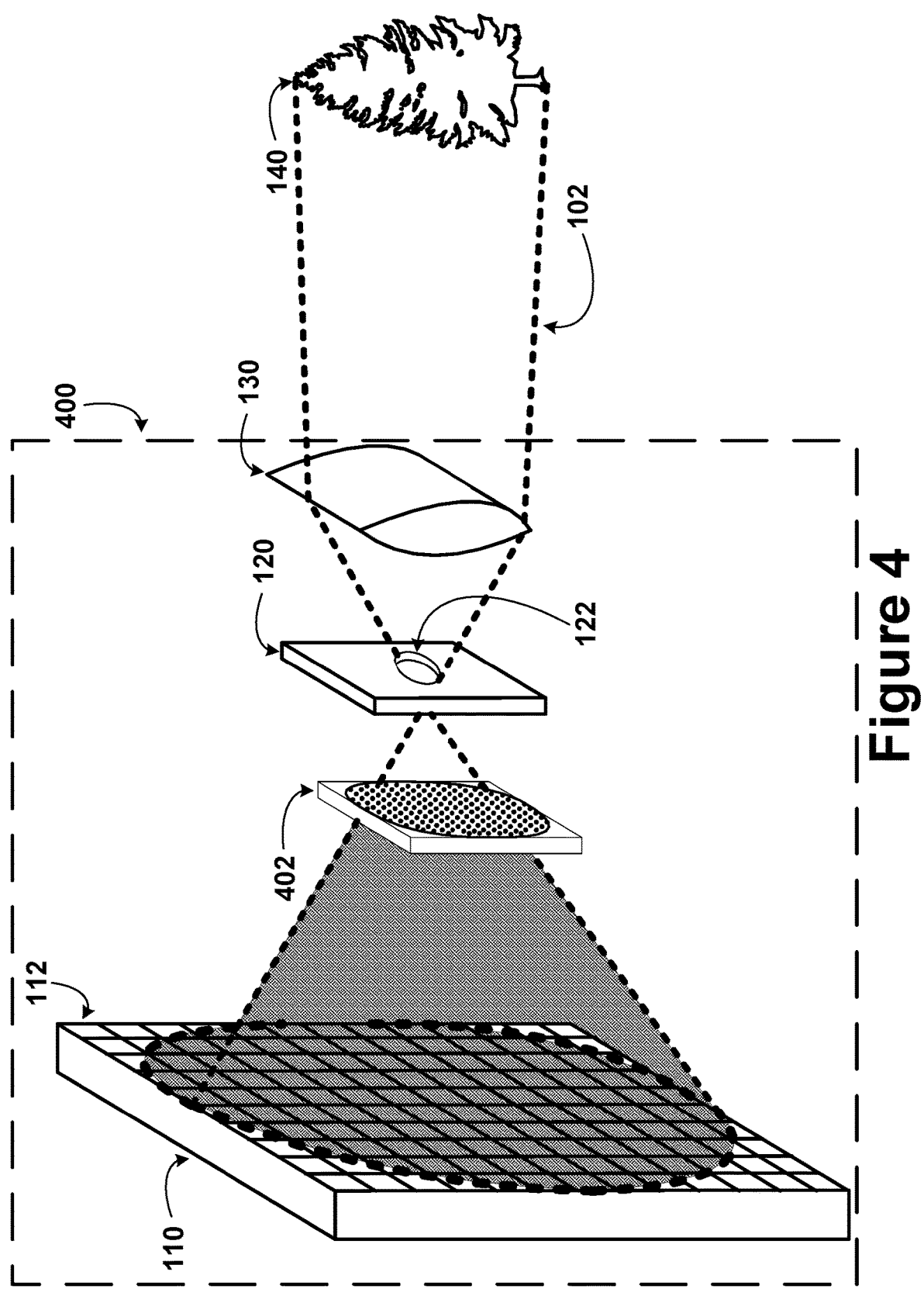
FIG. 4 is an illustration of a noise limiting system that includes an aperture, according to example embodiments.

FIG. 4 is an illustration of a noise limiting system 400 that includes an aperture, according to example embodiments. Similar to the system 100 illustrated in FIG. 1A, the system 400 may include an array 110 of light detectors 112, an aperture 122 defined within an opaque material 120, and a lens 130. The system 400 may also include an optical diffuser 402. The system 400 may measure light 102 scattered by an object 140 within a scene. The lens 130, the opaque material 120 defined with the aperture 122, and the array 110 of light detectors 112 may behave analogously as described with respect to FIG. 1A.

The optical diffuser 402 may evenly distribute the power density of the light 102 transmitted through the aperture 122 among the light detectors 112 by diffusing the light 102. The optical diffuser 402 may include a sandblasted glass diffuser, a ground glass diffuser, or a holographic diffuser, in various embodiments. Other types of optical diffusers are also possible. The optical diffuser 402 is one of a group of possible components that enhance an aspect of the divergence of the light 102 once the light 102 is transmitted through the aperture 122. Other divergence enhancing components could include optical waveguides or fluids with non-unity indices of refraction, for example.

In various embodiments, the optical diffuser 402 may be located in various positions relative to the array 110. As illustrated in FIG. 4, the optical diffuser 402 may be located in between the opaque material 120 and the array 110. Alternatively, the optical diffuser may be located on the array itself (e.g., the array may have a screen covering the surface of the array that includes the optical diffuser or each of the light detectors may individually be covered by a separate optical diffuser).

FIG. 5 is an illustration of a noise limiting system 500 that includes an aperture, according to example embodiments. Similar to the system 100 illustrated in FIG. 1A, the system 500 may include an array 110 of light detectors 112, an aperture 122 defined within an opaque material 120, and a lens 130. The system 500 may further include mirrors 502. The lens 130, the opaque material 120 defined with the aperture 122, and the array 110 of light detectors 112 may behave analogously as described with respect to FIG. 1A.

The mirrors 502 may reflect any of the light 102 that is transmitted through the aperture 122 that is diverted away from the array 110 (illustrated in FIG. 5 by the finely dashed lines). This process may be referred to as "photon recycling." The diversion of the light may occur due to a reflection of the light from a face of the array 110 (e.g., due to a partially reflective quality of faces of the light detectors 112 or from interstitial regions in between faces of the light detectors 112). In such a case, the mirrors 502 may redirect light reflected from the face of the array 110 back toward the array 110. Other inadvertent causes of light diversion are also possible.

As illustrated in FIG. 5, the mirrors 502 may be curved mirrors. In alternate embodiments there may be more or fewer mirrors. For example, in some embodiments, there may be a series of planar mirrors directing the light toward the array. In another alternate embodiment, there may instead be a single hollow cylinder or hollow cone, which encapsulates the light path between the aperture and the array, that has a reflective inner surface to redirect the light toward the array. Alternatively, there could be four mirrors, as opposed to two, having the shape of the mirrors 502 illustrated in FIG. 5 and positioned around the light path between the aperture and the array. Further, rather than mirrors, some embodiments may include a structure in between the aperture and the array that totally internally reflects the light traveling from the aperture to the array (e.g., the structure has an index of refraction that is large enough compared to an index of refraction of the surrounding material to induce total internal reflection). Such a structure may be referred to as a light-pipe. Various other arrangements, shapes, and sizes of mirrors are also possible.

Some embodiments may include multiple features described with respect to FIGS. 3-5. For example, an example embodiment may include an optical filter between the lens and the opaque material, an optical diffuser between the opaque material and the array, and mirrors between the optical diffuser and the array. Further, similar to the components within the noise limiting LIDAR device 210 illustrated in FIG. 2, the additional components illustrated in FIGS. 3-5 (e.g., the optical filter 302, the optical diffuser 402, and the mirrors 502) may also be on movable stages that are connectable to and controllable by a computing device. Other characteristics of these components (e.g., diffusivity of the optical diffuser 402 or angle of the mirrors 502) could also be controlled by a computing device, in various embodiments.

Figure 6A:
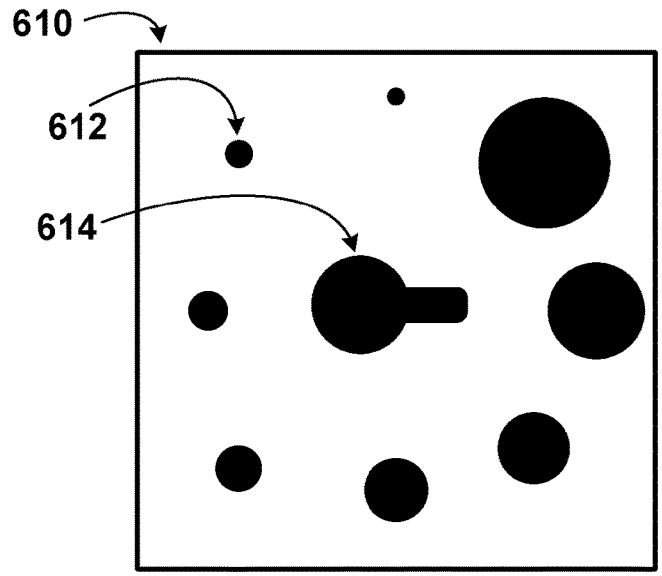
FIG. 6A is an illustration of an opaque material with various apertures defined therein, according to example embodiments.

FIG. 6A is an illustration of an opaque material 610 with various apertures defined therein, according to example embodiments. The apertures may be circular apertures 612 of varying sizes. Additionally or alternatively, the apertures may be irregular apertures 614. The various circular apertures 612 and the irregular aperture 614 may be selectable. For example, the opaque material 610 may be on a mechanical stage (e.g., a rotational stage or a translational stage) that can move with respect to a lens (e.g., the lens 130 illustrated in FIG. 1A) and an array of light detectors (e.g., the array 110 of light detectors 112 illustrated in FIG. 1A) so as to select one of the apertures.

The circular apertures 612 may vary in radius, thereby allowing varying amounts of light to pass through the respective apertures. In some embodiments, the larger radius apertures may allow for increased illumination of the array of light detectors, which may lead to an increased sensitivity of a corresponding noise limiting system (e.g., the noise limiting system 110 illustrated in FIG. 1A). However, when measuring scenes having an increased amount of background light, the circular apertures 612 having smaller radius may be used to block a greater proportion of the background light. Further, each of the circular apertures 612 may have different associated optical filters (e.g., overlaying the respective aperture or embedded within the respective aperture). For example, one of the circular apertures 612 may selectively transmit light within a visible wavelength range, and another of the circular apertures 612 may selectively transmit light within an infrared wavelength range. As such, a single opaque material 610, having multiple circular apertures 612 defined therein, may be capable of selectively transmitting light emitted from various sources (e.g., various laser emitters 212, as illustrated in FIG. 2). Various circular apertures 612 having various associated optical filters may have similar or different radii.

Irregular apertures may be specifically designed to account for optical aberrations within a system. For example, the keyhole shape of the irregular aperture 614 illustrated in FIG. 6A may assist in accounting for parallax occurring between an emitter (e.g., the laser emitter 212 illustrated in FIG. 2) and a receiver (e.g., the lens 130 and the array 110 of light detectors illustrated in FIG. 2 with the opaque material 610 located therebetween). The parallax may occur if the emitter and the receiver are not located at the same position, for example. Other irregular apertures are also possible, such as specifically shaped apertures that correspond with particular objects expected to be within a particular scene or irregular apertures that select for specific polarizations of light (e.g., horizontal polarizations or vertical polarizations).

Figure 6B:
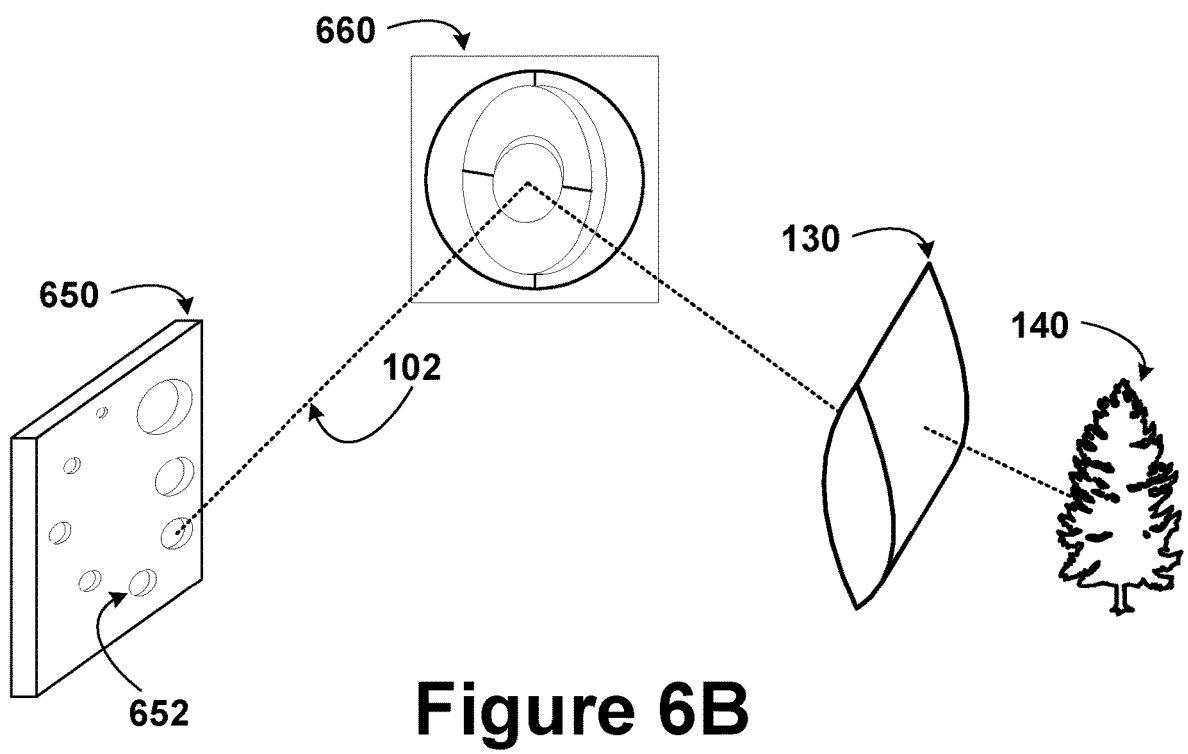
FIG. 6B is an illustration of a portion of a noise limiting system that includes apertures, according to example embodiments.

FIG. 6B is an illustration of a portion of a noise limiting system that includes apertures, according to example embodiments. Similar to the noise limiting system 100 of FIG. 1A, the noise limiting system may include a lens 130. The noise limiting system may additionally include an opaque material 650 with apertures 652 defined therein, and an adjustable MEMS mirror 660. The system may measure light 102 scattered by an object 140 within a scene.

The opaque material 650, similar to the opaque material 120 illustrated in FIG. 1A, may block the light 102 from the scene (e.g., background light) that is focused by the lens 130 from being transmitted to an array (e.g., the array 110 illustrated in FIG. 1A). The opaque material 650, and therefore the apertures 652 may be located with respect to the MEMS mirror 660 and the lens 130 such that the surface of the opaque material 650 is located at or near the focal plane of the lens 130. Similar to the embodiment of the opaque material 120 illustrated in FIG. 1A, the opaque material 650 may include a metal layer, a polymer substrate, a BoPET sheet, or a glass overlaid with an opaque mask.

The apertures 652, as illustrated, may be circular. In alternate embodiments, the apertures may be different shapes or sizes. Additionally or alternatively, in some embodiments there may be more or fewer apertures than illustrated in FIG. 6B. The apertures 652 may be aligned with respect to the MEMS mirror 660, such that a portion of the light 102 reflected by the MEMS mirror 660 passes through one of the apertures 652 and then intercepts an array of light detectors (e.g., the array 110 of light detectors 112 illustrated in FIG. 1A).

The MEMS mirror 660 may reflect the light 102 that is focused by the lens 130. The MEMS mirror 660 may rotate about multiple axes such that the reflected light 102 is directed toward a specific one, or multiple, of the apertures 652. In some embodiments, the rotation of the MEMS mirror 660 may be controlled by a computing device (e.g., a microcontroller). Further, in alternate embodiments, there may be a set of MEMS mirrors that sequentially reflect the light to direct the light toward one, or multiple, of the apertures. Multiple MEMS mirrors could be located on a single MEMS microchip or across multiple MEMS microchips, for example.

In alternate embodiments, the MEMS mirror (or other type of mirror) may replace the opaque material with the multiple apertures. For example, a reflective surface of the MEMS mirror (or MEMS mirror array) may be surrounded by an opaque material and the reflective surface may act to define an aperture. As such, the MEMS mirror may select a portion of the light, which is focused by the lens, to reflect toward the array. The unselected portion of the light may be absorbed by the opaque material, for example. In such example embodiments, the lens and the array may be disposed on the same side of the mirror. Further, in such embodiments where the mirror is a MEMS mirror array, the elements in the MEMS mirror array could be selectively switched to dynamically define a shape, a position, or a size of the reflective surface that defines the aperture.

Figure 7A:
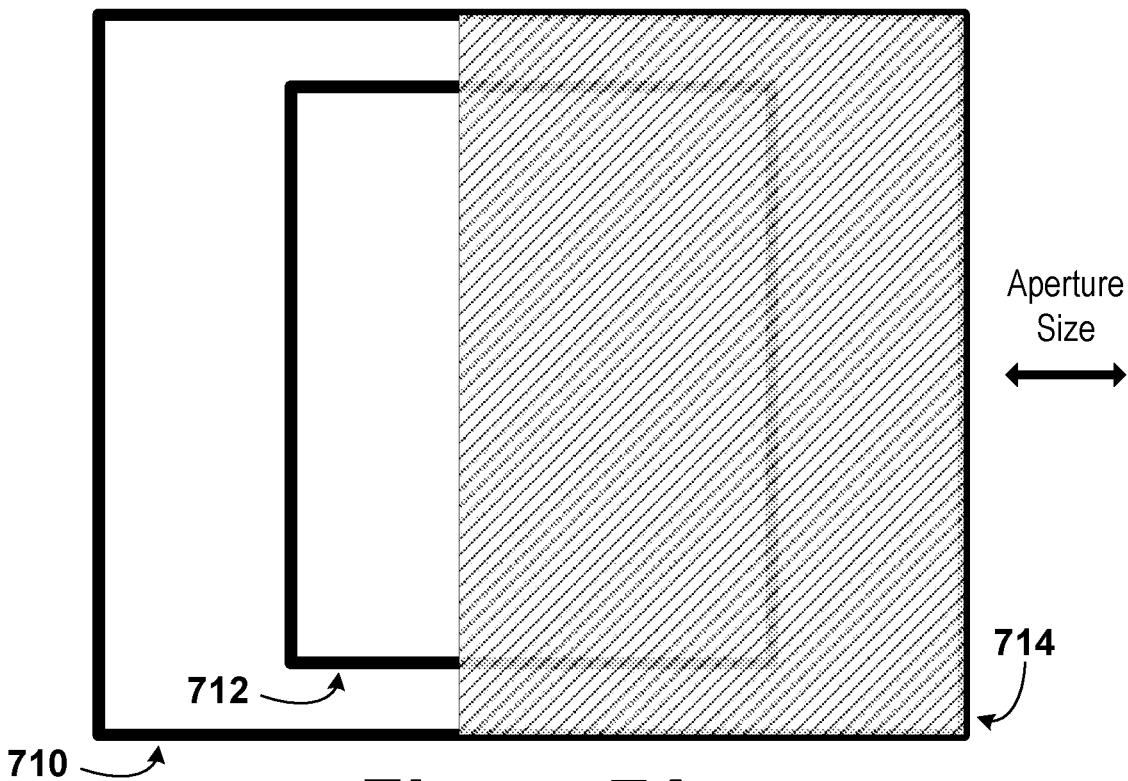
FIG. 7A is an illustration of an opaque material with a resizable aperture, according to example embodiments.

FIG. 7A is an illustration of an opaque material 710 with a resizable aperture, according to example embodiments. The opaque material 710 may have a slit 712 defined therein. Overlaying the opaque material 710 there may be an opaque shutter 714. The aperture may be adjusted in size by moving the opaque shutter 714 relative to the opaque material 710, thereby varying the covered portion of the slit 712. In such a way, the aperture size could be adjusted without varying the direction of projection of light (e.g., as is done in the embodiment illustrated in FIG. 6B) within a noise limiting system 100.

The opaque material 710, similar to the opaque material 120 illustrated in FIG. 1A, may block light from the scene from being transmitted to an array (e.g., the array 110 illustrated in FIG. 1A). The opaque material 710 may be located at the focal plane of a lens, in some embodiments.

The slit 712, without the opaque shutter 714, is analogous to the aperture of other embodiments. For example, if the opaque material 710 is a piece of glass overlaid by an opaque mask, the slit 712 is the negative region of the mask (i.e., the region of the mask where the mask material has been removed, e.g., by photolithography). Further, the dimensions of the slit 712 define the largest aperture size for a corresponding noise limiting system. As such, the size of the slit 712 is equivalent to the size of the aperture when the opaque shutter 714 has been fully retracted from covering the slit 712. In alternate embodiments, the slit could have a different shape. For example, the slit may be shaped so that when the opaque shutter is translated linearly over the slit, the size of the slit increases or decreases exponentially. Alternatively, the slit may be circularly shaped or irregularly shaped (e.g., keyhole shaped, such as the irregular aperture 614 illustrated in FIG. 6A). In still other embodiments, there could be multiple slits, which could be selected from and/or adjusted in size based on the location of the opaque shutter.

The opaque shutter 714 is a material that may be absorptive and/or reflective to a range of wavelengths of light. The range of wavelengths may include wavelengths of background light within a scene (e.g., if the opaque shutter 714 is a component of a noise limiting system within a LIDAR device). In some embodiments, the opaque shutter 714 could include a metal sheet, a BoPET sheet, or a polymer substrate. The opaque shutter 714 may be configured to move with respect to the opaque material 710 and the slit 712. For example, in some embodiments the opaque shutter 714 may be attached to a mechanical stage that can move translationally with respect to the opaque material 710 and the slit 712. Such movement may be controlled by a computing device (e.g., a microcontroller). In alternate embodiments, the opaque material and the slit may, instead, move with respect to the opaque shutter (e.g., the opaque material and the slit are attached to a mechanical stage, rather than the opaque shutter).

Figure 7B:
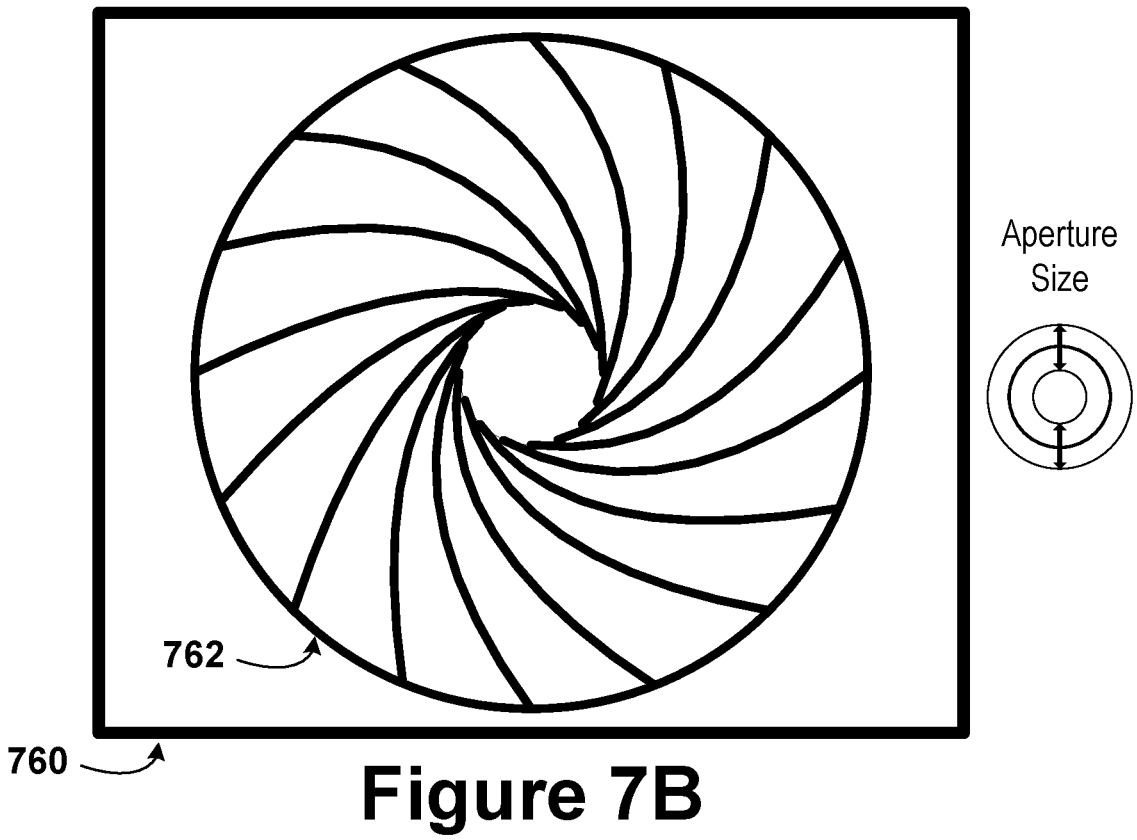
FIG. 7B is an illustration of an opaque material with a resizable aperture, according to example embodiments.

FIG. 7B is an illustration of an opaque material 760 with a resizable aperture, according to example embodiments. The opaque material 760 may be embedded with an iris 762. The iris 762 and the opaque material 760 may be fabricated out of the same or different materials. The aperture may be an opening defined by the iris 762. Further, the iris 762 may expand or contract to adjust the size of the aperture. In such a way, the aperture size could be adjusted without varying the direction of projection of light (e.g., as is done in the embodiment illustrated in FIG. 6B) within a noise limiting system 100. In some embodiments, the iris may be a standalone free-space optical component, rather than being embedded within an opaque material.

The iris 762 may be defined with multiple opaque fins (e.g., sixteen opaque fins as illustrated in FIG. 7B) that extend or retract to adjust the size of the aperture defined by the iris 762. The iris 762 may be a MEMS iris, in some embodiments. The opaque fins may be metallic, for example. Further, in some embodiments, the extension or retraction of the fins of the iris 762 may be controlled by a computing device (e.g., a microcontroller). A maximum extension of the opaque fins may result in the aperture having a minimum size. Conversely, a maximum retraction of the opaque fins may result in the aperture having a maximum size.

In alternate embodiments, the opaque material may include an active or passive matrix of liquid crystal light modulators, rather than an iris. In some embodiments, the matrix may include a patterned conductive electrode array with two polarizers. Between the two polarizers may be alignment layers and a liquid crystal layer. Such an arrangement may be similar to a liquid crystal display device. The matrix could define the aperture within the opaque material. For example, the matrix could be arbitrarily adjusted (e.g., by a computing device) to select a size, a position, or a shape of the aperture. Additionally, in some embodiments, the optical filter may be integrated within the matrix (e.g., on top or on bottom of the matrix, or sandwiched between layers of the matrix).

Figure 8:
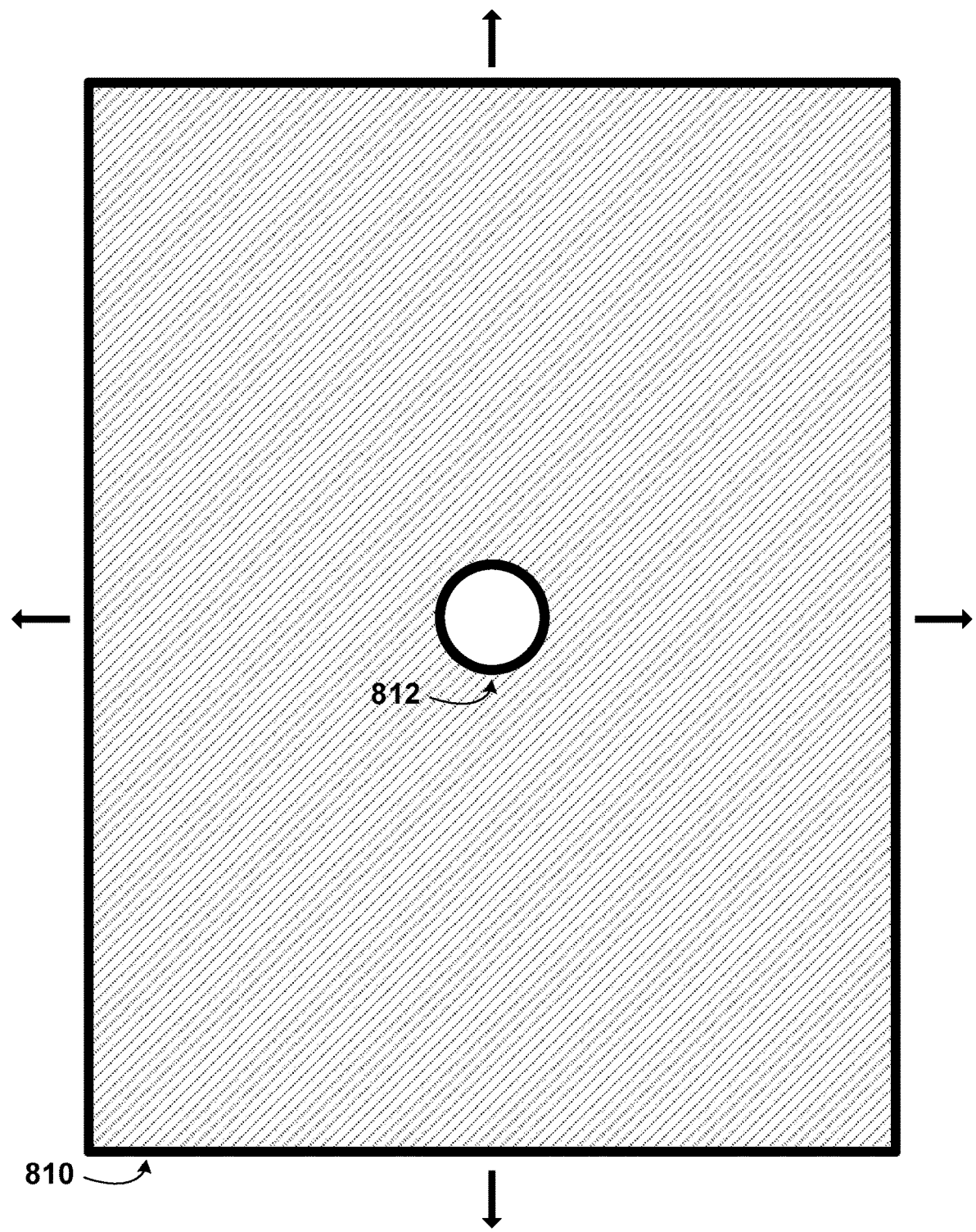
FIG. 8 is an illustration of an opaque material with an aperture having an adjustable location, according to example embodiments.

FIG. 8 is an illustration of an opaque material 810 with an aperture 812 having an adjustable location, according to example embodiments. For example, the opaque material 810 may translate in a two-dimensional plane, relative to a lens and an array of light detectors (e.g., the lens 130 and the array 110 of light detectors 112 within the noise limiting system 100 illustrated in FIG. 1A), to move the aperture 812. The opaque material 810 may be driven by a stage or an electric motor, in various embodiments. Further, such a stage or electric motor may be controlled by a computing device (e.g., a microcontroller). Similar to the opaque material 120 illustrated in FIG. 1A, the opaque material 810 may be etched metal, a BoPET sheet, or a glass overlaid with an opaque mask. Other materials are also possible.

The aperture 812 may be a circular aperture, as illustrated in FIG. 8. Alternatively, the aperture may have another shape, such as an oval, a rectangle, or an irregular shape (e.g., a keyhole shape similar to the shape of the irregular aperture 614 illustrated in FIG. 6A). Further, in some embodiments, the opaque material may have multiple apertures defined therein (e.g., similar to the opaque material 610 illustrated in FIG. 6A).

III. Example Processes

Figure 9:
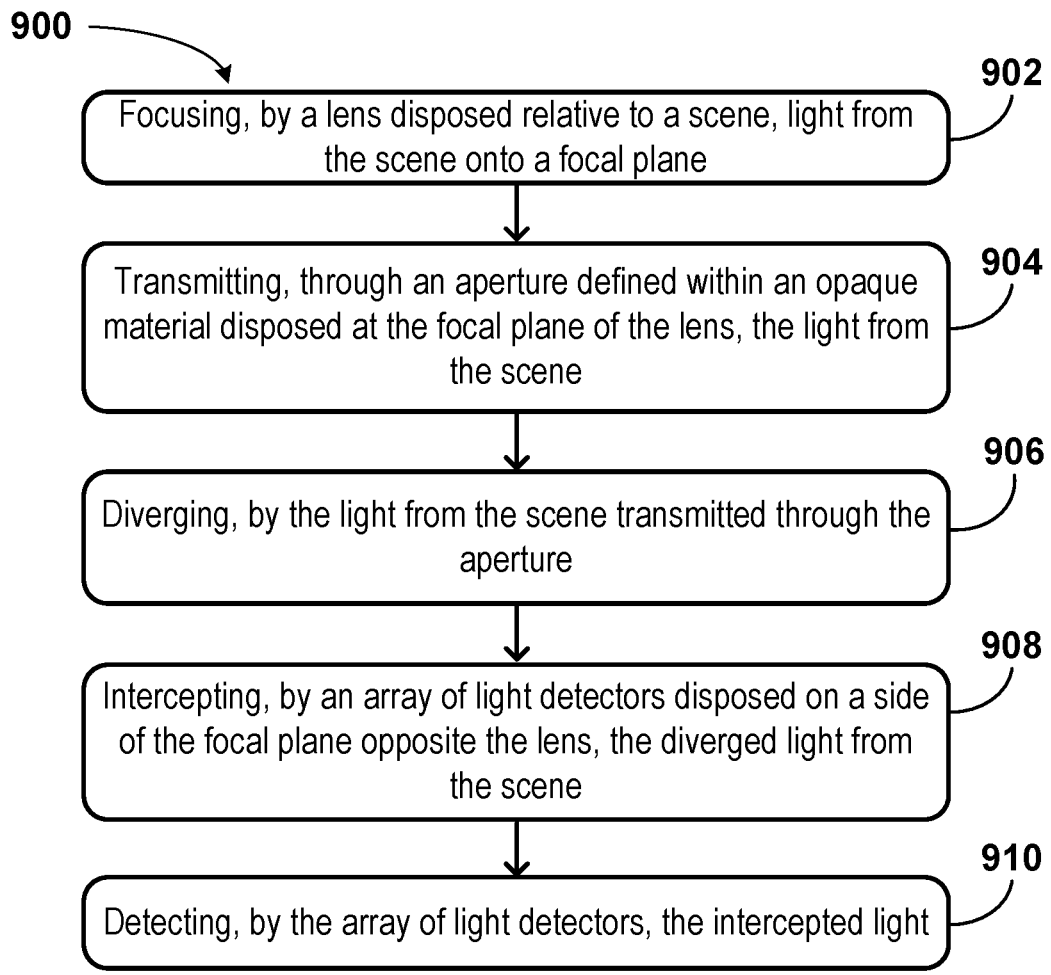
FIG. 9 is a flow diagram of a method, according to example embodiments.

FIG. 9 is a flow chart illustration of a method 900, according to example embodiments. The method 900 may be performed by the noise limiting system 100 illustrated in FIG. 1A, for example.

At block 902, the method 900 includes focusing, by a lens (e.g., the lens 130 illustrated in FIG. 1A) disposed relative to a scene, light from the scene onto a focal plane. The light from the scene may be scattered by an object (e.g., the object 140 illustrated in FIG. 1A) within the scene, in some embodiments.

At block 904, the method 900 includes transmitting, through an aperture (e.g., the aperture 122 illustrated in FIG. 1A) defined within an opaque material (e.g., the opaque material 120 illustrated in FIG. 1A) disposed at the focal plane of the lens, the light from the scene. The aperture has a cross-sectional area.

At block 906, the method 900 includes diverging, by the light from the scene transmitted through the aperture.

At block 908, the method 900 includes intercepting, by an array of light detectors disposed on a side of the focal plane opposite the lens, the diverged light from the scene. A cross-sectional area of the array of light detectors that intercept the diverged light from the scene is greater than the cross-sectional area of the aperture.

At block 910, the method 900 includes detecting, by the array of light detectors, the intercepted light.

IV. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system, comprising:
a lens disposed relative to a scene, wherein the lens is configured to focus light from the scene;
an opaque material, wherein the opaque material defines a plurality of apertures; and
an array of light detectors arranged to intercept diverging light, wherein the diverging light comprises light from the scene focused by the lens that diverges from at least one aperture of the plurality of apertures.

2. The system of claim 1, wherein the lens is configured to focus the light from the scene onto a focal plane, and wherein the opaque material is disposed at or near the focal plane of the lens.

3. The system of claim 1, wherein the plurality of apertures comprises at least a first aperture having a first size and a second aperture having a second size, wherein the second size is different than the first size.

4. The system of claim 3, wherein the first and second apertures are circular.

5. The system of claim 4, wherein the first aperture has a first radius and the second aperture has a second radius, wherein the second radius is different than the first radius.

6. The system of claim 3, wherein the plurality of apertures further comprises a third aperture having a third size, wherein the third size is different than the first size and different than the second size.

7. The system of claim 1, wherein the array of light detectors comprises a plurality of single photon avalanche diodes (SPADs).

8. The system of claim 1, wherein each aperture of the plurality of apertures has a respective cross-sectional area that is less than a cross-sectional area of the array of light detectors.

9. The system of claim 1, wherein the opaque material is movable with respect to the lens and the array of light detectors.

10. The system of claim 1, further comprising:
an optical filter associated with at least one aperture of the plurality of apertures.

11. The system of claim 10, wherein the optical filter selectively transmits light within a wavelength range.

12. The system of claim 1, further comprising:
one or more mirrors, wherein the one or more mirrors are adjustable to direct the light from the scene focused by the lens toward a specific aperture of the plurality of apertures.

13. The system of claim 12, wherein the one or more mirrors comprise microelectromechanical systems (MEMS) mirrors.

14. A method comprising:
focusing, by a lens disposed relative to a scene, light from the scene;
transmitting the focused light through at least one aperture of a plurality of apertures defined within an opaque material;
intercepting, by an array of light detectors, diverging light, wherein the diverging light comprises light from the scene focused by the lens that diverges from the at least one aperture of the plurality of apertures; and
detecting, by the array of light detectors, the intercepted light.

15. A light detection and ranging (LIDAR) device comprising:
a LIDAR transmitter configured to illuminate a scene with light;
a LIDAR receiver configured to receive light reflected by one or more objects within the scene, wherein the LIDAR receiver comprises:
a lens configured to focus the reflected light from the scene;
an opaque material, wherein the opaque material defines a plurality of apertures; and
an array of light detectors arranged to intercept diverging light, wherein the diverging light comprises light from the scene focused by the lens that diverges from at least one aperture of the plurality of apertures.

16. The LIDAR device of claim 15, wherein the plurality of apertures comprises at least a first aperture having a first size and a second aperture having a second size, wherein the second size is different than the first size.

17. The LIDAR device of claim 16, wherein the first and second apertures are circular.

18. The LIDAR device of claim 17, wherein the first aperture has a first radius and the second aperture has a second radius, wherein the second radius is different than the first radius.

19. The LIDAR device of claim 15, wherein the array of light detectors comprises a plurality of single photon avalanche diodes (SPADs).

20. The LIDAR device of claim 15, wherein each aperture of the plurality of apertures has a respective cross-sectional area that is less than a cross-sectional area of the array of light detectors.

* * * * *